May 28, 1929.　　　　O. DOBBELSTEIN　　　　1,714,853
APPARATUS FOR DRYING, CHARRING, AND OTHERWISE TREATING LOOSE MATERIAL
Filed March 29, 1926　　2 Sheets-Sheet 1

Witnesses:　　　　　　　　　　Inventor:
　　　　　　　　　　　　　　　Otto Dobbelstein

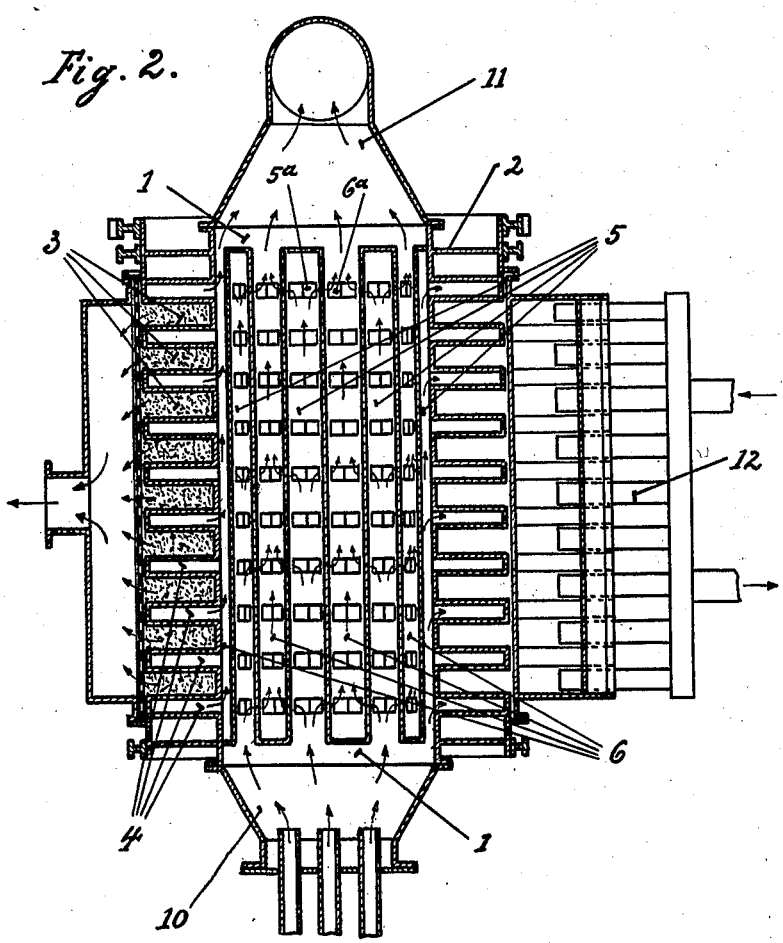
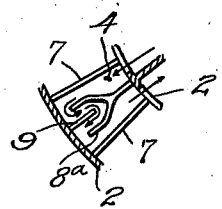

Patented May 28, 1929.

UNITED STATES PATENT OFFICE.

OTTO DOBBELSTEIN, OF ESSEN, GERMANY; KEROLINE DOBBELSTEIN EXECUTRIX OF SAID OTTO DOBBELSTEIN, DECEASED.

APPARATUS FOR DRYING, CHARRING, AND OTHERWISE TREATING LOOSE MATERIAL.

Application filed March 29, 1926, Serial No. 98,386, and in Germany April 4, 1925.

This invention relates to improvements in apparatus for drying, charring and otherwise treating loose material, of the kind comprising essentially a closed rotary drum divided into circumferential annular chambers alternately designed to be charged with the material and to be traversed by a heating medium, and means to circulate a heating medium through said heating chambers.

According to the present invention, means are provided to ensure a thorough utilization of the heating medium, hereinafter briefly called gas, during its travel through said drum and thereby to attain an increased heating action, while furthermore a fan can be provided in the main heating channel of the drum for creating a vigorous circulation of the gas and allowing an escape of such a quantity thereof only as is required for avoiding an increase of pressure by the incoming fresh-gas.

Figure 1:
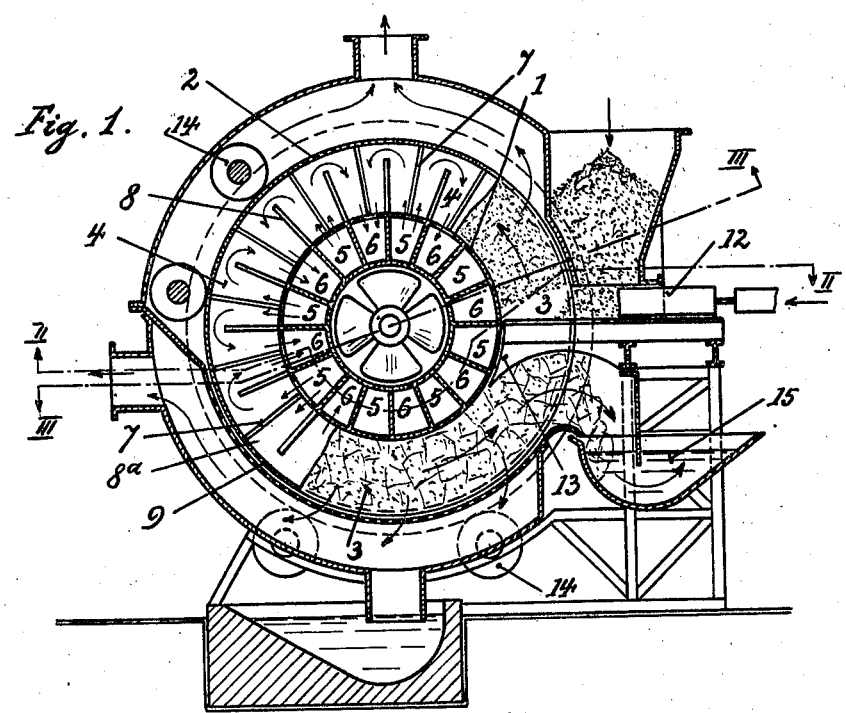
Figure 3:
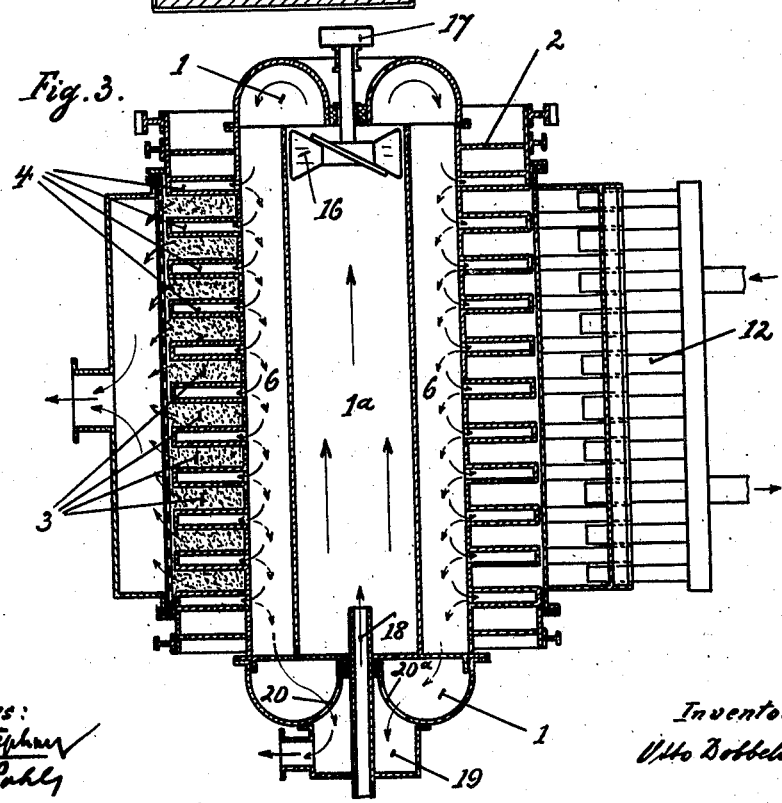

The accompanying drawings illustrate the improved arrangement: Fig. 1 is a vertical cross-section through the apparatus, Fig. 1a shows a modification of a detail thereof, while Figs. 2 and 3 are longitudinal sections through the apparatus respectively on the lines II—II and III—III of Fig. 1.

The main heating channel 1 forming the central part of the closed rotary drum 2 comprising the reception-chambers 3 for the material to be treated and the heating chambers 4, is divided into a plurality of radial guiding channels 5 and 6, which in alternate succession serve for the supply of gas to the heating chambers and for its escape therefrom respectively and which to this end are closed at their respective ends (Fig. 2) and each provided in their outer walls with openings $5^a$, $6^a$ respectively (Figs. 1 and 2) communicating with the respective heating chambers, so that the gas from the channels 5 can enter the heating chambers and after its passage therethrough escape into the channels 6. The annular heating chambers 4 are subdivided by radial partition-walls 7 in such a way that the gas can enter or escape respectively along both sides of said partition-walls 7 (Fig. 1). Between each two partition-walls 7, a baffle-plate 8 extends from the inner wall of the heating chamber to a short distance from the outer wall of the latter, whereby the gas is compelled to travel along said outer wall. As shown in Fig. 1a, said baffle-plate may be bifurcated as shown at $8^a$ and another baffle-plate 9 may extend from the outer wall of each of the heating chambers into the middle of the bifurcation of said baffle-plate, whereby a further distribution of the gas in the heating chambers is attained. The gas supply pipe 10 and the gas outlet pipe 11 of the apparatus are stationary.

The material to be treated is forced into the reception chambers 3 by means of a reciprocating plunger arrangement 12 located above the discharging scraper 13, counter-pressure rollers 14 at the opposite drum side taking-up the pressure exerted by the plungers 12, said pressure-rollers extending over the whole length of the drum 2 and acting upon the contents in the reception chambers 3, so as to compress the material therein when swelling during its treatment. Beneath the discharging scraper 13, means, for instance a water-seal 15 of known type are provided, for preventing cold outer air detrimental to the heating of the reception chambers from entering the latter when discharging the material therefrom.

To further utilize the gas within the drum 1 and to allow an escape of such a quantity of gas only as is required for avoiding an increase of pressure by the incoming fresh-gas, the following arrangement may be provided (Fig. 3) :—

The main heating channel 1 is closed at both ends preferably by bulbed covers ensuring a frictionless guiding of the gas along the same, and it has a central open-ended pipe $1^a$ within said radial guiding channels 5, 6, while a fan 16 is located at the rear end of said pipe $1^a$, the shaft of said fan extending beyond the closed rear end of the channel 1 and carrying there a driving-pulley 17. The closed front end of the channel 1 is fitted with a central gas supply pipe 18, around which an outer gas outlet casing 19 is arranged and in communication with said channel 1 through slots 20, $20^a$ in the closed front end thereof.

The operation is as follows: The fan creates a vigorous circulation of the gas entering through the pipe 18 and flowing first directly through the pipe $1^a$ to the rear end of the channel 1, it taking then its way through the radial channels 5, 6 and the heating chambers 4 from the rear to the front end of the channel 1, where it escapes through the slots 20, 20ª into the gas outlet casing 19 surrounding the gas supply pipe 18.

What I claim, is:

1. In an apparatus for drying and charring loose material, the combination of a rotary drum provided with spaced internal circumferential annular heat receiving chambers, and spaced external circumferential annular material receiving chambers alternating with the heating chambers, a central main heating channel within said drum divided into a plurality of radial guiding channels, the alternate channels being closed at alternating opposite ends and provided with openings communicating with the heating chambers, serving in alternate succession to supply heating fluid to the annular heating chambers and permitting the escape of the heating fluid.

2. In an arrangement as specified in claim 1, radial partition-walls subdividing said annular heating chambers, the openings in the outer walls of said channels communicating with the heating chambers at both sides of said partition-walls.

3. In an arrangement as specified in claim 1, radial partition-walls subdividing said annular heating chambers, the openings in the outer walls of said channels communicating with the heating chambers at both sides of said partition walls, and a baffle-plate between each two partition-walls extending from the inner end of the heating chamber to a short distance from the outer wall of the latter.

4. In an arrangement as specified in claim 1, radial partition-walls subdividing said annular heating chambers, the openings in the outer walls of said channels communicating with the heating chambers at both sides of said partition-walls, a bifurcated baffle-plate between each two partition-walls extending from the inner wall of the heating chamber to a short distance from the outer wall of the latter, and another baffle-plate extending from the outer wall of the heating chamber into the middle of the bifurcation of said baffle-plate.

5. In an arrangement as specified in claim 1, means to prevent cold outer air detrimental to the heating of the chambers for the reception of the material to be treated from passing into said chambers when discharging the material therefrom.

6. In an arrangement as specified in claim 1, in which said central main heating channel is closed at both ends and has a central open-ended pipe within said radial guiding channels, a power-driven fan located at the rear end of said pipe, a gas supply pipe fitted in the closed front end of said channel, and an outer gas outlet casing surrounding said gas supply pipe and in communicaiton with said channel through slots in the closed front end thereof.

In testimony whereof I have hereunto set my hand.

OTTO DOBBELSTEIN.